United States Patent [19]

Tsutsui

[11] Patent Number: 5,220,655
[45] Date of Patent: Jun. 15, 1993

[54] DISTRIBUTED COMPUTER NETWORK FOR TRACKING THE ACCESS PATH OF A USER

[75] Inventor: Hiroshi Tsutsui, Tokyo, Japan

[73] Assignee: Kabushiki Kaisha Toshiba, Kawasaki, Japan

[21] Appl. No.: 666,717

[22] Filed: Mar. 8, 1991

[30] Foreign Application Priority Data

Mar. 9, 1990 [JP] Japan ................................ 2-058863

[51] Int. Cl.$^5$ .............................................. G06F 13/38
[52] U.S. Cl. .............................. 395/325; 364/DIG. 1; 364/242.94; 364/284.4; 364/285.4; 364/286.5
[58] Field of Search ................ 364/DIG. 1; 395/200, 395/325, 600

[56] References Cited

U.S. PATENT DOCUMENTS

| | | | |
|---|---|---|---|
| 4,718,005 | 1/1988 | Feigenbaum et al. | 364/DIG. 1 |
| 4,885,789 | 12/1989 | Burger et al. | 364/DIG. 1 |
| 4,930,159 | 5/1990 | Kravitz et al. | 364/DIG. 1 |
| 4,962,449 | 10/1990 | Schlesinger | 364/DIG. 1 |
| 4,987,536 | 1/1991 | Humblet | 364/DIG. 1 |

*Primary Examiner*—Thomas M. Heckler
*Attorney, Agent, or Firm*—Oblon, Spivak, McClelland, Maier & Neustadt

[57] ABSTRACT

Information with respect to a requested user who accessed a node and information with respect to a process activated in the node are stored in a file system. By successively tracking nodes accessed by the user, a path through which the user accessed the network is tracked. When the path of the network entered different management domains, a tracking operation is requested to nodes in the management domains. The results are collected and transferred to the requesting node.

4 Claims, 4 Drawing Sheets

DISTRIBUTED COMPUTER NETWORK FOR TRACKING THE ACCESS PATH OF A USER

BACKGROUND OF THE INVENTION

1. Field of the Invention

The present invention relates to a distributed type computer network for connecting and unifying a plurality of computer systems distributedly disposed through a communication medium.

2. Description of the Related Art

Recently, a distributed type computer network for allowing resources such as a file system and CPU to be shared with a plurality of computer systems (hereinafter named nodes) has gained public attention.

The distributed type computer network can advantageously share its resources with the nodes distributed in wide areas. However, as the network scale increases, the probability of illegal accesses also proportionally increases.

To prevent that, it is necessary to track a node and a path through which an illegal user accessed the network so as to improve the reliability thereof.

However, in most distributed type computer networks, at most the node just preceding the path through which the illegal user accessed the network can be tracked. Thus, to completely track the path through which the illegal user accessed the network, many complicated processes are required among all the related nodes and thereby much labor and time are disadvantageously used.

SUMMARY OF THE INVENTION

An object of the present invention is to provide a distributed type computer network for readily and accurately tracking a requested user from any node without considering the entire structure of the network.

Another object of the present invention is to provide a distributed type computer network for tracking a path through which a requested user accessed the network even if the path entered a plurality of management domains.

To accomplish the above mentioned objects, the distributed type computer network for tracking a path through which a requested user accessed a network, the distributed type computer network having a plurality of nodes according to the present invention comprises user information storage means for storing at least a user name, distinctive information of a local access or a remote access, and an accessed node name for a remote access as information with respect to a user accessing the node, process information storage means for storing at least an activated process name and a process activated time as information with respect to a process activated in the node, determination means for determining whether an access of the node by any requested user is a local access or a remote access in accordance with the distinctive information contained in the user information, check means for checking an accessed node name in accordance with the user name of the requested user by using the user information when the determination means determined that the node is remotely accessed, tracking request means for transferring to the accessed node checked by the check means at least a local node name, connection process activated time and an activated process name in accordance with the user name of the requested user stored in the user information storage means and the process information storage means and for requesting the accessed node to track a path through which the requested user accessed the network, information search means for searching process information in accordance with information being transferred from the tracking request means from the process information storage means, and information transfer means for transferring user information in accordance with process information searched by the information search means to the tracking requesting node, whereby the tracking requesting node successively requests the accessed node to track the requested user through the tracking request means until the determination means determined that the access of the local node or the accessed node by the requested user is a local access.

Thus, according to the present invention, without considering the entire structure of the network, a path through which a requested user accessed the network can be readily and precisely tracked.

DESCRIPTION OF PREFERRED EMBODIMENTS

With reference to the accompanying drawings, embodiments according to the present invention will be described in the following.

Figure 1:
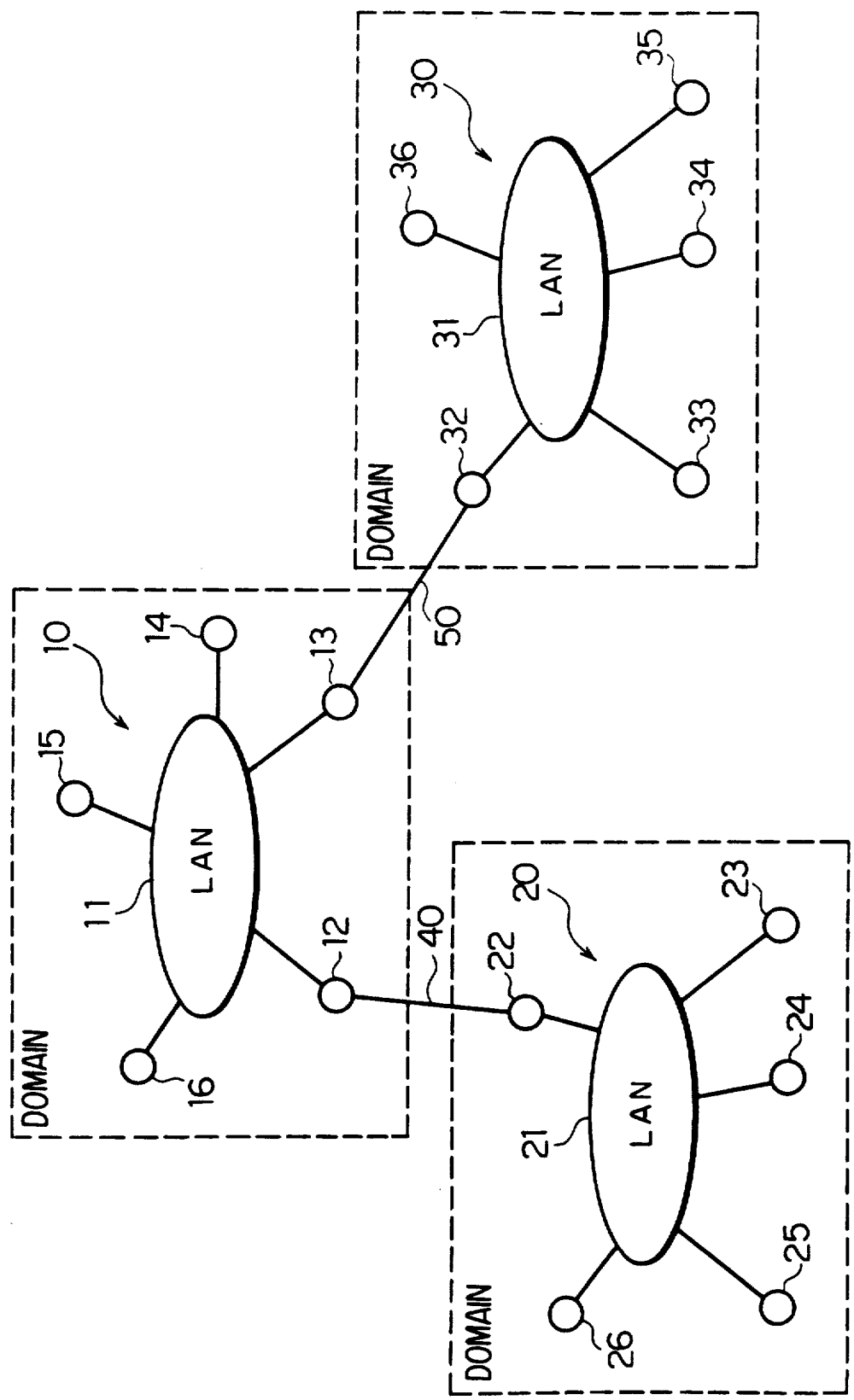
FIG. 1 is a block diagram showing the entire structure of a distributed type computer network of an embodiment according to the present invention.

FIG. 1 is a block diagram showing the entire structure of a distributed type computer network of an embodiment according to the present invention.

As shown in the figure, the distributed type computer network is composed of a plurality of LAN's (local area networks) 10, 20, and 30. The LAN's 10, 20, and 30 are composed of communication mediums 11, 21, and 31 and a plurality of nodes 12 to 16, 22 to 26, and 32 to 36, respectively, the communication mediums 11, 21, and 31 being connected to the plurality of nodes 12 to 16, 22 to 26, and 32 to 36, respectively. Particular nodes (12 and 22; and 13 and 32) in the LAN's 10, 20, and 30 are connected through dedicated communication mediums 40 and 50, respectively. Thus, data communications are made among all the nodes in the LAN's 10, 20, and 30.

In the distributed type computer network, portions of the LAN's 10, 20, and 30 which are surrounded with the dashed lines are named management domains. In other words, data communications are made directly among nodes only in each of the management domains.

Figure 2:
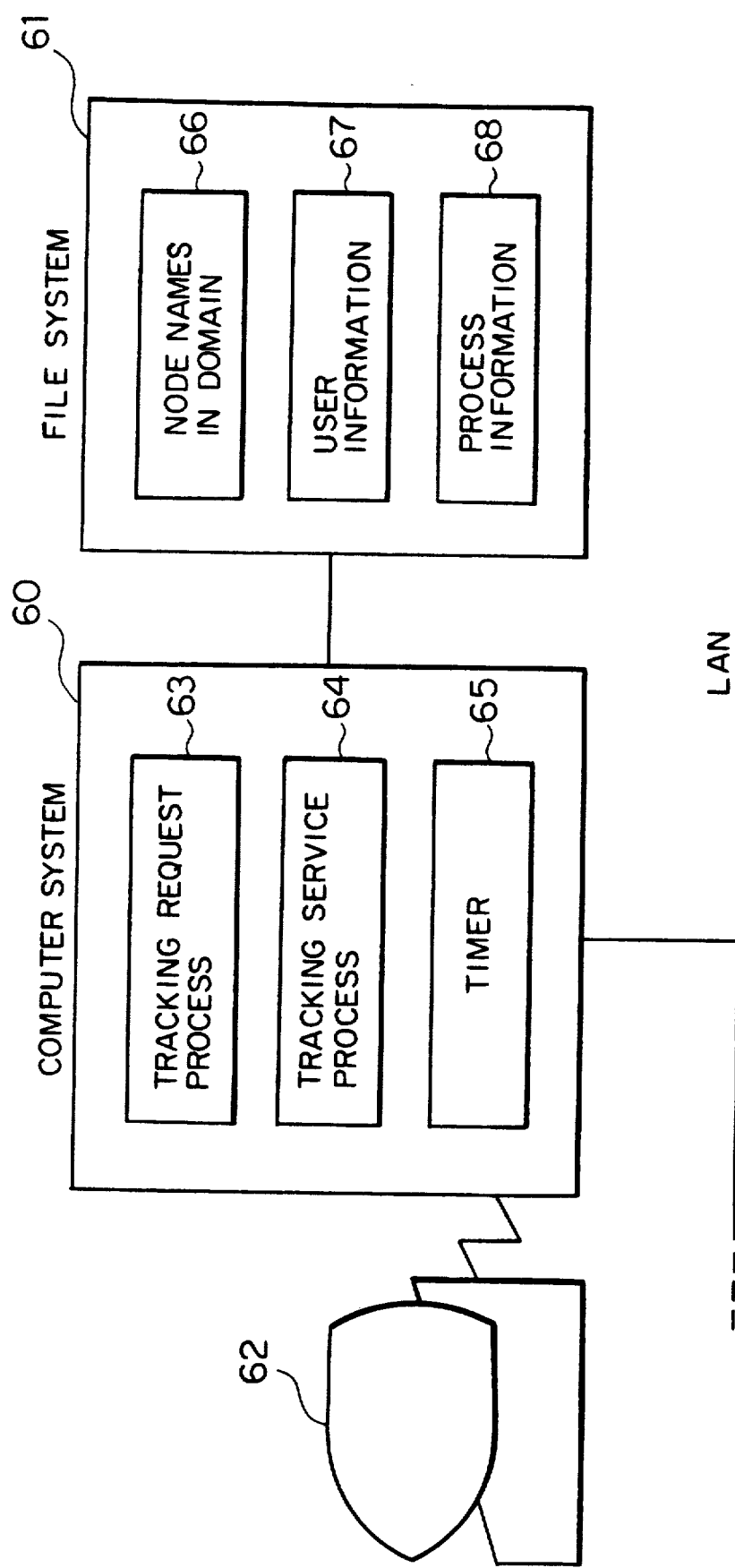
FIG. 2 is a block diagram showing the structure of nodes in the distributed type computer network shown in FIG. 1.

FIG. 2 is a block diagram showing the structure of a node. In the figure, the reference numeral 60 is a computer system. The computer system 60 is connected to a file system 61 and a display input terminal 62. The computer system 60 is provided with a tracking request process 63 for requesting another node to track a path through which a requested user accessed the network; a tracking service process 64 for receiving a tracking request from another node and for executing the tracking; and a timer 65 for retrieving current time.

In addition, the file system 61 stores all node names 66 included in the management domain of the local node, user information 67, and process information 68.

The user information 67 consists of the following data:
(1) the name of the user who accessed a particular node;
(2) the name of the accessing terminal;
(3) whether there was a remote access or a local access; and
(4) the name of the accessing node (in the case of a remote access).

The process information 68 consists of the following data:
(1) the name of the process activated;
(2) the activated time; and
(3) the name of the terminal activated.

Figure 3:
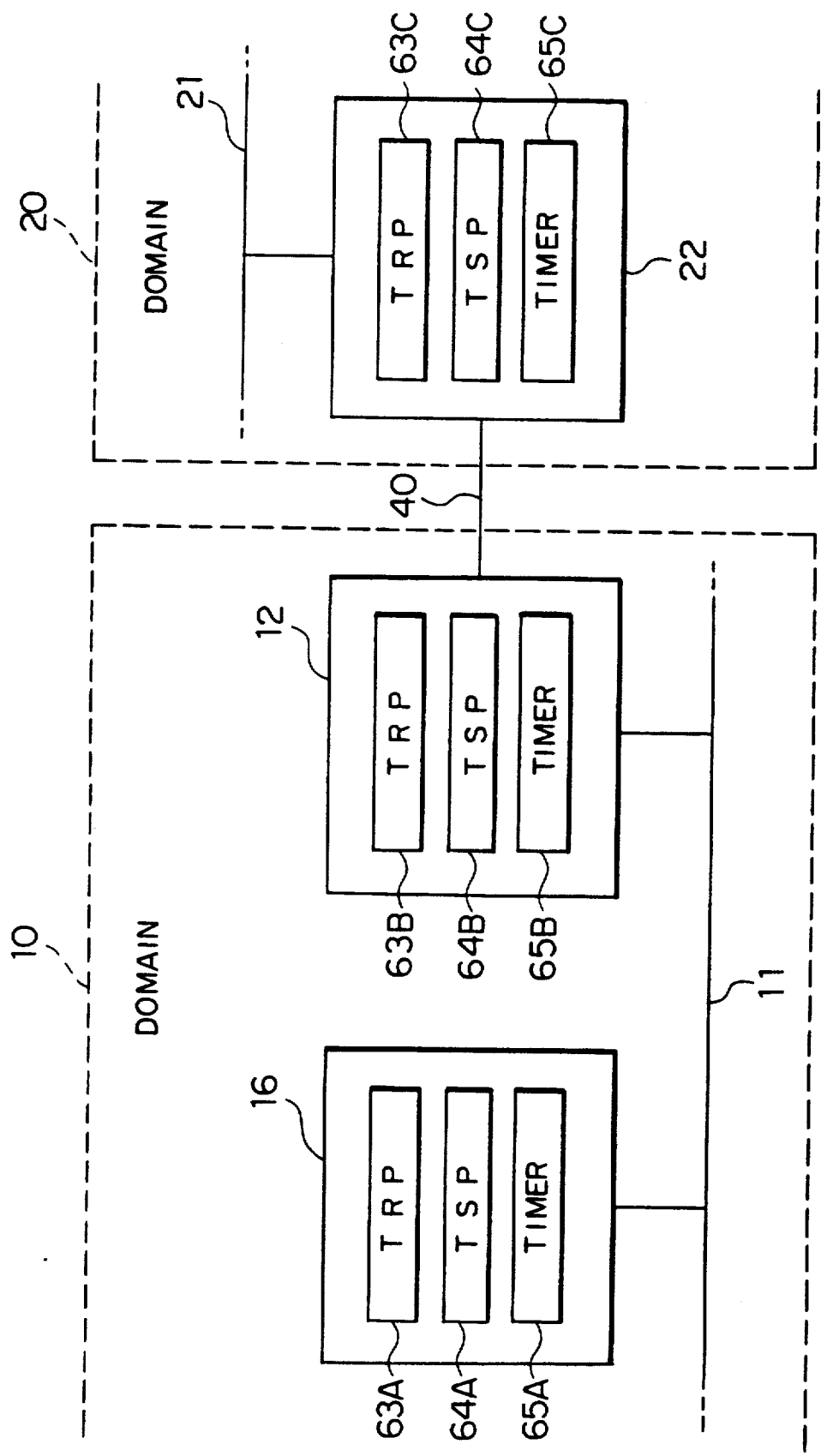
FIG. 3 is a block diagram describing an operation of tracking a path through which a requested user accessed the distributed type computer network shown in FIG. 1.
Figure 4:
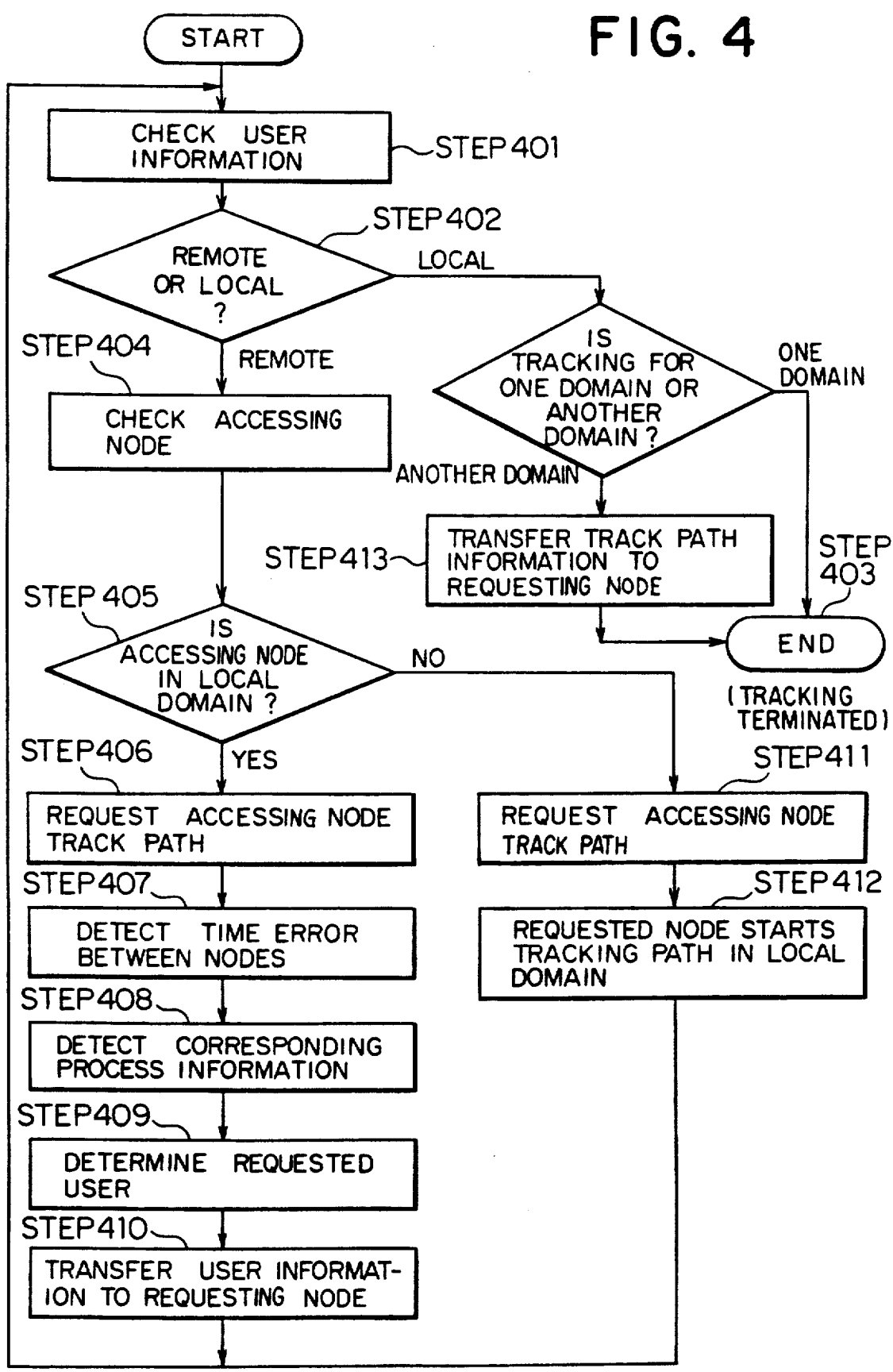
FIG. 4 is a flow chart showing an entire operation of tracking a path through which a requested user accessed the network.

Then, with reference to FIGS. 3 and 4, an operation of the distributed type computer network will be described.

In the node 16 of the LAN 10 (management domain) shown in FIG. 3, when a requesting user designates a user name to be tracked, a tracking request process (hereinafter named the TRP and illustrated in the flow chart of FIG. 4) 63A in the node 16 is activated.

Thereafter, the TRP 63A retrieves the user information 67 in the file system 61 by using the user name as key data (in the step 401). The TRP 63A determines whether or not the requested user is a local user or a remote user by using the resultant data (in the step 402).

When the TRP 63A determined that the requested user is a local user, it informs the requesting user of that through the display input terminal 62 and terminates the tracking operation (in the step 403).

On the other hand, when the TRP 63A determined that the requested user is a remote user, it checks the node from which the requested user accessed the network in accordance with the user information 67 being checked (in the step 404).

Thereafter, the TRP 63A determines whether or not the accessing node 12 is in the local management domain in accordance with the node names 66 in the local domain stored in the file system 61 (in the step 405).

When the TRP 63A determined that the accessing node 12 is in the local management domain, it transfers the following information items to a tracking service process 64B (hereinafter named the TSP and illustrated in the flow chart of FIG. 4) in the accessing node 12 and requests it to track a path through which the requested user accessed the network (in the step 406):
(a) the name of the local node;
(b) the current time;
(c) the time the process activated;
(d) the name of the process activated (the name of the activated connection process used for a remote access); and
(e) a serial number (which represents a serial access number when the same connection process is used in a local nodes).

Thus, the node 16 waits for the accessing node 12 to transfer the resultant data to it.

When the TSP 64B in the node 12 received the tracking request, it retrieves the current time of the local node 12 by using the timer 65B, compares it with the current time (b) transferred from the requesting node 16, and obtains the error therebetween (in the step 407).

Thereafter, the TSP 64B searches the process information which meets both the connection process according to the "name of the process activated, (d)" and the "process" which designates the requesting node 16 from the file system 61 in the local node 12.

Moreover, the TSP 64B detects the process information 68 where the value whose process activated time was corrected by the time error between the nodes accords with the process activation start time (c) transferred from the requesting node 16 (in the step 408).

When the TSP 64B searched the process information 68, it searches the requested user information 67 from the activated terminal name included in the process information 68 and determines that the user name of the user information 67 is the requested user (in the step 409).

When the TSP 64B did not obtain the process information which meets the time in the step 408, it serially numbers the groups of the process information 68 in chronological order and searches the process information 68 whose number matches the serial number (e) transferred from the requesting node 16.

Thereafter, the TSP 64B searches the user information 67 in accordance with the process information 68 from the file system 61 in the local node by using the activated terminal name and then transfers the user information 67 to the TRP 63A in the requesting node 16 (in the step 410).

Practically, the following information is transferred to the TRP 63A in the requesting node 16:
(1) the name of the user;
(2the connection process activated time (value where error has been corrected);
(3) the name of the accessing terminal;
(4) whether there was a remote access or a local access; and
(5) the name of the accessing node and the name of the used connection process (in the case of remote access).

Thereafter, the TRP 63A in the requesting node 16 displays such information on the display input terminal 62. In addition, the TRP 63A redetermines whether the requested user is a local user or a remote user in the node 12 in accordance with the above mentioned user information in the step 402. Thereafter, when the TRP 63A determined that the requested user is a local user, it terminates the tracking operation (in the step 403).

When the TRP 63A determined that the requested user is a remote user, it redetermines whether or not the accessing node represented with the information (5) is included in the local management domain in the step 405.

As the result, when the TRP 63A determined that the accessing node is included in the local management domain, it requests the TSP in the accessing node (not shown in the figure) to track the path through which the requested user accessed the network (in the step 406).

Thereafter, this operation is repeated until the TRP 63A determines that the requested user is a local user.

When the TRP 63A determined that the accessing node is in another management domain in the step 405, it requests the TSP 64C in the accessing node 22 to track the path through which the requested user accessed the network (in the step 411).

When the TSP 64C received the tracking request, it substitutionally starts tracking the path through which the requested user accessed the network in the management domain included in the local node 22 instead of the node 16 which requested the tracking operation (in the step 412).

Likewise, the processes from the step 401 to the step 412 are repeated.

When the TRP 63A determined that the requested user is a local user in the step 402, the TSP 64C in the node 22 transfers all the collected information with respect to the network tracking path to the TRP 64A in the requesting node 16 (in the step 413) and then terminates the tracking operation (in the step 403).

As was described above, in the distributed type computer network according to the present invention, a path through which a requested user accessed the network can be determined rapidly and accurately without considering the overall structure thereof.

Moreover, in the distributed type computer network according to the present invention, even if the network access path entered a plurality of management domains, a path through which a requested user accessed the network can be rapidly and accurately determined.

What is claimed is:

1. A distributed computer network for tracking a path through which a user accessed a network, said distributed computer network having a plurality of domains, each of said domains having at least one node, each of said nodes comprising:
    a node bus;
    first determination means for determining if the node was accessed by a user locally or remotely, connected to the bus;
    user information storage means, connected to the bus, for storing a name of a user accessing the node, whether the node was accessed by a local access or a remote access as determined by the first determination means, and an accessing node name when the first determination means determines that the node was accessed remotely;
    process information storage means, connected to the bus, for storing an activated process name and a process activated time as information with respect to a process activated in said node;
    second determination means, connected to the bus, for determining whether an access of said node by said user is a local access or a remote access by examining the stored information of the user information storage means;
    check means, connected to the bus, for checking a name of an accessing node in accordance with the user name of said user by using said user information stored in said user information storage means when said second determination means determines that said node is remotely accessed;
    tracking request means, connected to the bus, for transferring to said accessing node checked by said check means, tracking information including a local node name of the accessing node, a connection process activated time and an activated process name in accordance with the user name of said user stored in said user information storage means and said process information storage means and for requesting said accessing node to track a path through which said user accessed the network;

information search means, connected to the bus, for searching process information for tracking information from another node requesting tracking; and
    information transfer means, connected to the bus, for transferring user information in accordance with the process information searched by said information search means to said another node requesting tracking;
    whereby said another node requesting tracking successively requests said accessing node to track said user through said tracking request means until said determination means determined that the access of the local node or said accessing node by said requested user is a local access.

2. A distributed computer network in which a plurality of nodes are included in a plurality of management domains, each of said nodes comprising:
    a node bus;
    first determination means, connected to the bus, for determining if the node was accessed by a user locally or remotely;
    user information storage means, connected to the bus, for storing a user name, whether the node was accessed by a local access or a remote access as determined by the access determining means, and an accessing node name when the first determination means determines that the node was accessed remotely;
    process information storage means, connected to the bus, for storing an activated process name and a process activated time as information with respect to a process activated in said node;
    node name storage means, connected to the bus, for storing node names in a management domain of said node;
    second determination means, connected to the bus, for determining whether an access of said node by a user is a local access or a remote access using said stored information indicating whether the node was accessed by a local access or a remote access stored in said user information storage means;
    check means, connected to the bus, for checking a name of an accessing node in accordance with the user name of said user by using said user information stored in said information storage means when said second determination means determines that said node is remotely accessed;
    third determination means, connected to the bus, for determining whether or not a name of said accessing node determined by said second determination means is stored in said node name storage means;
    tracking request means, connected to the bus, for transferring to said accessing node a local node name of the accessing node, a connection process activated time and an activated process name in accordance with a user name of said requested user stored in said user information storage means and said process information storage means and for requesting said accessed node to track a path through which said user accessed the network when said third determination means determines that said accessing node name is stored in said node name storage means;
    information search means, connected to the bus, for searching process information for tracking information from another node requesting tracking;
    first information transfer means, connected to the bus, for transferring user information in accordance with the process information searched by said information search means to said anther node requesting tracking;

tracking substitute request means, connected to the bus, for requesting said accessed node to substitutionally track a path through which said user accessed the network when said third determination means determines that said accessed node name is not stored in said node name storage means; and second information transfer means, connected to the bus, for transferring a network access path tracked by said requested node to said another node requesting tracking.

3. A distributed computer network as set forth in claim 1 or claim 2, each of said nodes further comprising:

timer means, connected to the bus, for retrieving a current time;

time transfer means, connected to the bus, for transferring said current time retrieved by said timer means to said accessing node when said tracking request means requests said accessed node to track the path through which said user accessed the network;

time error computation means, connected to the bus, for computing an error between the current time transferred from another node through said time transfer means and that of said timer means of the local node; and time correction means, connected to the bus, for correcting a correction process activated time transferred from said another node through said tracking request means in accordance with said error computed by said error computation means.

4. A distributed type computer network as set forth in claim 1 or claim 2, whereby said user information storage means and said process information storage means further store a node access terminal name and a process activated terminal name so as to relate the user information with the process information.

* * * * *